United States Patent
Harbuzaru et al.

(10) Patent No.: US 6,942,847 B2
(45) Date of Patent: Sep. 13, 2005

(54) SOLID CRYSTALLINE IM-9, AND A PROCESS FOR ITS PREPARATION

(75) Inventors: Bogdan Harbuzaru, Mulhouse (FR); Jean-Louis Paillaud, Mulhouse (FR); Joel Patarin, Flaxlanden (FR); Nicolas Bats, Pomeys (FR); Loic Rouleau, Charly (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/758,290

(22) Filed: Jan. 16, 2004

(65) Prior Publication Data

US 2004/0209759 A1 Oct. 21, 2004

(30) Foreign Application Priority Data

Jan. 16, 2003 (FR) .............................. 03 00431

(51) Int. Cl.[7] .............................. C01B 39/48
(52) U.S. Cl. .................. 423/718; 423/706; 423/709; 208/46
(58) Field of Search ................ 423/718, 706, 423/709; 208/46

(56) References Cited

U.S. PATENT DOCUMENTS

| | | | | |
|---|---|---|---|---|
| 5,202,014 A | * | 4/1993 | Zones et al. ................ | 208/46 |
| 5,958,370 A | * | 9/1999 | Zones et al. ................ | 423/706 |
| 6,049,018 A | * | 4/2000 | Calabro et al. ............. | 585/446 |
| 6,086,848 A | * | 7/2000 | Nakagawa et al. ......... | 423/706 |
| 6,652,831 B1 | * | 11/2003 | Villaescusa Alonso et al. .. | 423/706 |
| 2004/0042958 A1 | * | 3/2004 | Canos et al. ................ | 423/718 |

OTHER PUBLICATIONS

Corma A et al: "Determination of the Pore Topology of Zeolite IM–5 by Means of Catalytic Test Reactions and Hydrocarbon Adsorption Measurements", Journal of Ctalysis, Academic Press, Duluth, MN, US, vol. 189, NR. 2, pp. 382–394 XP004438043.

* cited by examiner

Primary Examiner—David Sample
(74) Attorney, Agent, or Firm—Millen, White, Zelano & Branigan, P.C.

(57) ABSTRACT

A zeolite crystalline solid, designated IM-9, having an X ray diffraction diagram according to FIG. 1, has a chemical composition, expressed as the anhydrous base, in terms of moles of oxides, in accordance with the formula $XO_2$: $mYO_2$: $pZ_2O_3$: $qR_{2/n}O$: $sF$, in which R represents one or more cation(s) with valency n, X represents one or more tetravalent element(s) other than germanium, Y represents germanium, Z represents at least one trivalent element and F is fluorine. The solid is useable, for example as an adsorbent or catalyst.

11 Claims, 1 Drawing Sheet

SOLID CRYSTALLINE IM-9, AND A PROCESS FOR ITS PREPARATION

FIELD OF THE INVENTION

The present invention relates to a novel crystalline solid hereinafter designated IM-9 with a novel crystalline structure, to a process for preparing said solid IM-9, and to the use of said solid as a catalyst and adsorbant.

PRIOR ART

In the past few years, the search for novel microporous molecular sieves has led to the synthesis of a wide variety of that class of products. A wide variety of aluminosilicates with a zeolitic structure characterized by their chemical composition, the diameter of the pores they contain and the shape and geometry of their microporous system has been developed.

Included among the zeolites that have been synthesized over the past forty years or so, a certain number of solids have produced significant progress in the fields of adsorption and catalysis. Examples thereof that can be cited are Y zeolite (U.S. Pat. No. 3,130,007) and ZSM-5 zeolite (U.S. Pat. No. 3,702,886). The number of novel molecular sieves, including zeolites, that is synthesized every year is constantly increasing. A more complete description of the different molecular sieves that have been discovered can be found in the work entitled (Atlas of Zeolite Structure Types", Ch Baerlocher, W M Meier and D H Olson, Fifth Revised Edition, 2001, Elsevier. The following can be cited: NU-87 zeolite (U.S. Pat. No. 5,178,748), MCM-22 zeolite (U.S. Pat. No. 4,954,325) or CLO type gallophosphate (colverite) (U.S. Pat. No. 5,420,279), or ITQ-13 (U.S. Pat. No. 6,471,941), CIT-5 (U.S. Pat. No. 6,043,179), and ITQ-21 (International patent application WO-A-02/092511).

Several of the zeolites cited above were synthesized in a fluoride medium, in which the mobilizing agent was not the usual hydroxide ion but the fluoride ion, using a process that was initially described by J-L Guth et al (Proc Int Zeol Conf, Tokyo, 1986, p 121). The pHs of the synthesis media were typically close to neutrality. One advantage of such fluorinated reaction systems is that they produce purely silicic zeolites containing fewer defects than zeolites obtained in the traditional OH⁻ medium (J M Chezeau et al, Zeolites, 1991, 11, 598). One other decisive advantage linked to the use of fluorinated reaction media is that they can produce novel framework topologies containing double ring units of four tetrahedra, as is the case with ITQ-7, ITQ-13, ITQ-17 zeolites. Further, the use of germanium in those synthesis media also encourages the production of such a framework in the case of ITQ-2 1 zeolite.

DESCRIPTION OF THE INVENTION

Figure 1:
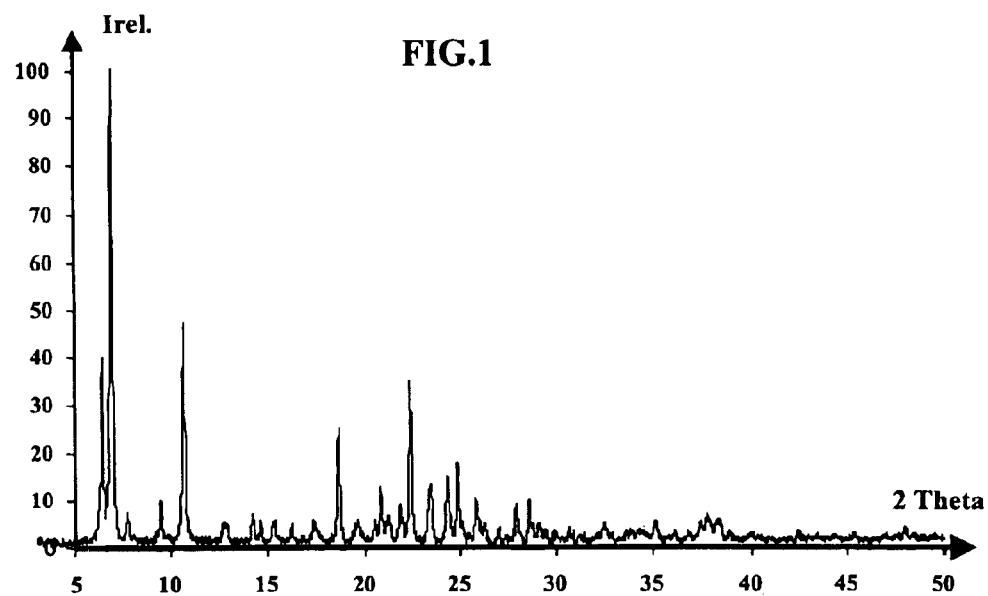

The present invention pertains to a novel crystalline solid, designated crystalline solid IM-9, and having an X ray diffraction diagram including at least the peaks shown in Table 1. This diagram is shown in FIG. 1. This novel crystalline solid IM-9 has a novel crystalline structure.

This diffraction diagram is obtained by radiocrystallographic analysis using a diffractometer using a conventional powder technique with the $K\alpha_1$ line of copper ($\lambda$=1.5406 Å). From the position of the diffraction peaks represented by the angle $2\theta$, the Bragg relationship is used to calculate the characteristic interplanar spacings $d_{hkl}$ of the sample. The error in the measurement, $\Delta(d_{hkl})$ over $d_{hkl}$, is calculated using the Bragg relationship as a function of the absolute error $\Delta(2\theta)$ made in the measurement of $2\theta$. An absolute error $\Delta(2\Delta)$ of ±0.2° is usually accepted. The relative intensity $I_{rel}$ for each value of $d_{hkl}$ is measured from the height of the corresponding peak. The X ray diffraction diagram of the crystalline solid IM-9 of the invention comprises at least the peaks with the values of $d_{hkl}$ given in Table I. In the $d_{hkl}$ column, the mean values of the interplanar spacings are given in Angstroms (Å). An error measurement $\Delta(d_{hkl})$ in the range ±0.2 Å to ±0.008 Å must be assigned to each of these values.

TABLE 1

Mean values of $d_{hkl}$ and relative intensities, measured on an X ray diffraction diagram of the crystalline solid IM-9 of the invention

| $d_{hkl}$ (Å) | I/I₀ | 2theta (degrees) |
|---|---|---|
| 13.74 | mw | 6.425 |
| 12.74 | VS | 6.933 |
| 11.42 | vw | 7.735 |
| 9.36 | w | 9.442 |
| 8.30 | m | 10.653 |
| 6.94 | vw | 12.745 |
| 6.23 | vw | 14.204 |
| 6.06 | vw | 10.605 |
| 5.79 | vw | 15.291 |
| 5.47 | vw | 16.192 |
| 5.11 | vw | 17.337 |
| 4.76 | mw | 18.627 |
| 4.56 | vw | 19.452 |
| 4.52 | vw | 19.625 |
| 4.32 | vw | 20.541 |
| 4.25 | w | 20.887 |
| 4.17 | vw | 21.291 |
| 4.06 | w | 21.876 |
| 3.97 | mw | 22.377 |
| 3.79 | w | 23.449 |
| 3.65 | w | 24.365 |
| 3.57 | w | 24.917 |
| 3.44 | w | 25.874 |
| 3.39 | vw | 26.262 |
| 3.30 | vw | 26.995 |
| 3.19 | vw | 27.946 |
| 3.12 | w | 28.589 |
| 3.07 | vw | 29.067 |
| 2.98 | vw | 29.956 |
| 2.91 | vw | 30.698 |
| 2.84 | vw | 31.473 |
| 2.76 | vw | 32.413 |
| 2.55 | vw | 35.160 |
| 2.49 | vw | 36.040 |
| 2.44 | vw | 36.798 |
| 2.40 | vw | 37.441 |
| 2.38 | vw | 37.763 |
| 2.35 | vw | 28.266 |
| 2.13 | vw | 42.404 | in which
VS = very strong;
S = strong;
m = medium;
mw = medium weak;
w = weak;
vw = medium weak.

The relative intensity I/I₀ is given with respect to a scale of relative intensity giving a value of 100 to the most intense peak in the X ray diffraction diagram: vw<15; 15≦f<30; 30≦mw<50; 50≦m<65; 65≦S<85; VS≧85.

The diffraction diagram for the crystalline solid IM-9 of the invention has no peaks in the range 65≦S<85.

Figure 2:
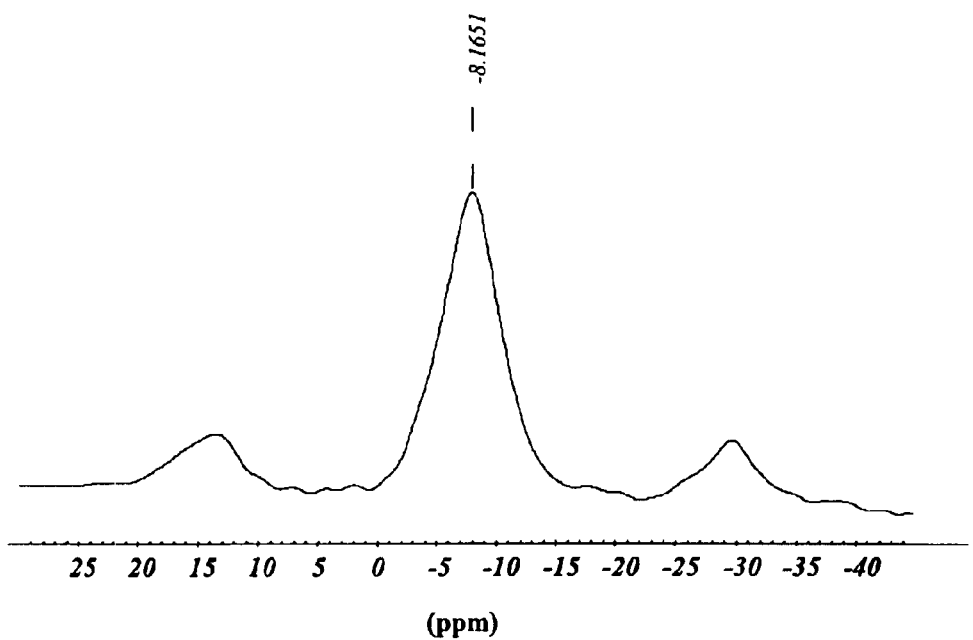

The crystalline solid IM-9 of the invention has a novel basic crystalline structure or topology which is characterized by its X ray diffraction diagram shown in FIG. 1. The novel crystalline structure of the crystalline solid IM-9 of the invention is a three-dimensional structure formed by tetrahedras. It comprises units of the "double ring unit with four tetrahedral" type, demonstrated by $^{19}F$ nuclear magnetic resonance (FIG. 2). The peak of each tetrahedron is occupied by an oxygen atom.

Said solid has a chemical composition, expressed as the anhydrous base, in terms of moles of the oxides, defined by the following general formula: $XO_2$: $mYO_2$: $PZ_2O_3$: $qR_{2/n}O$: $sF$ (I), in which R represents one or more cation(s) with valency n, X represents one or more tetravalent element(s) other than germanium, Y represents germanium, Z represents at least one trivalent element and F is fluorine. In formula (I), m, p, q, s respectively represent the number of moles of $YO_2$, $Z_2O_3$, $R_{2/n}O$ and F.

Advantageously, the ratio Ge/X of the framework of the crystalline solid IM-9 of the invention is 1 or less. Preferably, m is in the range 0.1 to 0.9, and more preferably, m is in the range 0.3 to 0.7. The ratio $\{(1+m)/p\}$ is 5 or more and more preferably 7 or more. The value of p is preferably in the range 0 to 0.5, highly preferably in the range 0 to 0.4, still more preferably in the range 0.01 to 0.4. The values of q and s are advantageously in the range 0.01 to 0.7, and highly advantageously in the range 0.1 to 0.5.

In accordance with the invention, X is preferably selected from silicon, tin and titanium, and Z is preferably selected from aluminium, boron, iron, indium and gallium, and highly preferably Z is aluminium. Preferably, X is silicon: the crystalline solid IM-9 of the invention is then a crystalline metallosilicate with an X ray diffraction diagram that is identical to that described in Table 1. More preferably, X is silicon and Z is aluminium: the crystalline solid IM-9 of the invention is then a crystalline aluminosilicate with an X ray diffraction diagram identical to that described in Table 1.

In the case in which the crystalline solid IM-9 of the invention is in the as synthesized form, i.e. directly from synthesis and prior to any calcining and/or ion exchange step, which are well known to the skilled person, said solid IM-9 comprises at least one organic nitrogen-containing cation as will be described below or its decomposition products, or its precursors. In its as synthesized form, the cation(s) R present in formula (I) is (are) at least partially, and preferably entirely, said organic nitrogen-containing cation(s). In a preferred mode of the invention, R is the cation (6R,10S)-6,10-dimethyl-5-azoniaspiro-[4,5]decane in the case in which the crystalline solid IM-6 is in the as synthesized form. (6R,10S)-6,10-dimethyl-5-azoniaspiro-[4,5]decane acts as an organic template. Said template used during the preparation of the crystalline solid IM-9, as will be described below in the description, compensates for the negative charge on the framework. The template can be eliminated using conventional prior art techniques such as heat and/or chemical treatments. In accordance with a further preferred mode of the invention, the cation (6R,10S)-6,10-dimethyl-5-azoniaspiro-[4,5]decane is mixed with another cation, preferably an alkali cation, for example sodium, in the case in which the crystalline solid IM-6 is in the as synthesized form.

The crystalline solid IM-9 of the invention is zeolitic.

The invention also concerns a process for preparing the crystalline solid IM-9 in which an aqueous mixture, comprising at least one source of at least one oxide $XO_2$, optionally at least one source of the oxide $YO_2$, optionally at least one source of at least one oxide $Z_2O_3$ and optionally at least one source of an oxide $M_{2/w}O$ and at least one organic nitrogen-containing cation R, or a precursor of an organic nitrogen-containing cation or a decomposition product of the organic nitrogen-containing cation, is reacted, the mixture generally having the following molar composition:

| | |
|---|---|
| $(XO_2 + YO_2)/Z_2O_3$ | at least 5, preferably at least 7; |
| $M_{2/w}O/(XO_2 + YO_2)$ | 0 to 3, preferably 0 to 1, and more preferably 0.01 to 1; |
| $H_2O/(XO_2 + YO_2)$ | 1 to 50, preferably 2 to 30; |
| $R/(XO_2 + YO_2)$ | 0.1 to 3, preferably 0.1 to 1; |
| $F/(XO_2 + YO_2)$ | 0.1 to 3, preferably 0.1 to 1; |
| $YO_2/XO_2$ | 0 to 1, preferably 0.5 to 1; |
| $L_aS/XO_2$ | 0 to 0.5, preferably 0 to 0.3; | in which X is one or more tetravalent element(s) other than germanium, preferably silicon, Y is germanium, Z is one or more trivalent element(s) selected from the group formed by the following elements: aluminium, iron, boron, indium and gallium, preferably aluminium, M is a cation with valency w which may comprise an alkali metal and/or ammonium cation. $L_aS$ is a salt, S being an anion with valency a and L being an alkali metal or ammonium ion, which may be similar to M, or a mixture of M and a further alkali metal or ammonium ion necessary to balance the anion S, S possibly comprising an acid radical added, for example, in the form of a salt of L or an aluminium salt. The cation M used is preferably an alkali metal, in particular sodium. Examples of S that can be cited are strong acid radicals such as the bromide, chloride, iodide, sulphate, phosphate or nitrate, or weak acid radicals such as organic acid radicals, for example the citrate or the acetate. While $L_aS$ is not essential, it may accelerate crystallization of the solid IM-9 of the invention from the reaction mixture and it may also affect the size and shape of the crystals constituting the solid IM-9. In all cases, the reaction is continued until crystallization occurs.

Fluorine can be introduced in the form of salts of alkali metals or of ammonium, such as NaF, $NH_4F$, $NH_4HF_2$ or in the form of hydrofluoric acid or in the form of hydrolysable compounds which can release fluoride ions into the water such as silicon fluoride $SiF_4$ or ammonium or sodium fluorosilicate, $(NH_4)_2SiF_6$ or $Na_2SiF_6$.

In accordance with the process of the invention, R is an organic nitrogen-containing template. Preferably, R is an organic nitrogen-containing compound of the (6R,10S)-6,10-dimethyl-5-azoniaspiro-[4,5]decane type, or one of its derivatives. Preferably, it is a salt of (6R,10S)-6,10-dimethyl-5-azoniaspiro-[4,5]decane such as the halide, sulphate, nitrate, acetate, silicate or aluminate, or the hydroxide of (6R,10S)-6,10-dimethyl-5-azoniaspiro-[4,5]decane.

The cation M and/or the organic template can be added in the form of hydroxides or salts of mineral acids provided that the ratios $M_{2/w}O/(XO_2+YO_2)$ and $R/(XO_2+YO_2)$ are respected.

The source of element X can be any compound comprising the element X and which can liberate that element in aqueous solution in the reactive form. Advantageously, when the element X is silicon, the silicon source can be any one of those routinely used in synthesizing zeolites, for example solid powdered silica, silicic acid, colloidal silica or dissolved silica, or tetraethoxysilane (TEOS). Of the powdered silica that can be used, it is possible to use precipitated silicas, in particular those obtained by precipitation from a solution of an alkali metal silicate, such as aerosil silicas, pyrogenic silicas, for example "CAB-O-SIL", and silicon gels. It is possible to use colloidal silicas with different particle sizes, for example with a mean equivalent diameter in the range 10 to 15 nm or in the range 40 to 50 nm, such as those sold under the trade name "LUDOX", for example. Dissolved silicas that can be used also include commercially available soluble glass silicates containing 0.5 to 6.0, in particular 2.0 to 4.0 moles of $SiO_2$ per mole of alkali metal oxide, silicates of "active" alkali metals such as those defined in British patent GB-A-1 193 254, and silicates obtained by dissolving silica in an alkali metal hydroxide or a quaternary ammonium hydroxide, or a mixture thereof. Preferably, the silicon source is TEOS.

The source of element Z can be any compound comprising the element Z and which can liberate that element in aqueous solution in the reactive form. In the preferred case in which Z is aluminium, the alumina source is preferably sodium aluminate, or an aluminium salt, for example the chloride, nitrate, the hydroxide or the sulphate, an aluminium alkoxide or alumina itself, preferably in the hydrated or hydratable form, such as colloidal alumina, pseudoboehmite, gamma alumina or an alpha or beta trihydrate. It is also possible to use mixtures of the sources cited above.

Some or all of the sources of alumina and silica can optionally be added in the form of the aluminosilicate.

The source of element Y can, for example, be germanium oxide $GeO_2$.

In a preferred implementation of the process of the invention, an aqueous mixture comprising silica, alumina, germanium oxide, hydrofluoric acid and the hydroxide of (6R,10S)-6,10-dimethyl-5-azoniaspiro-[4,5]decane is reacted.

The process of the invention consists of preparing an aqueous reaction mixture termed a gel and comprising at least one source of at least one oxide $XO_2$, optionally at least one source of the oxide $YO_2$, optionally at least one source of at least one oxide $Z_2O_3$, optionally at least one source of an oxide $M_{2/w}O$ and at least one organic nitrogen-containing cation R, or at least one precursor of an organic nitrogen-containing cation or at least one decomposition product of an organic nitrogen-containing cation. The quantities of said reagents are adjusted to endow said gel with a composition that allows it to crystallize into the crystalline solid IM-9 with formula $XO_2$: $mYO_2$: $pZ_2O_3$: $qR_{2/n}O$: sF, in which m, p, q, n and s satisfy the criteria defined above. The gel then undergoes a hydrothermal treatment until the crystalline solid IM-9 is formed. The gel is advantageously subjected to hydrothermal conditions under autogenous reaction pressure, optionally adding a gas, for example nitrogen, at a temperature in the range 120° C. to 200° C., preferably in the range 140° C. to 180° C., and more preferably at a temperature that does not exceed 175° C. until the crystals of solid IM-9 of the invention are formed. The time required to obtain crystallization generally varies between 1 hour and several months, depending on the composition of the reagents in the gel, the stirring rate and the reaction temperature. The reaction is generally carried out with stirring or in the absence of stirring, preferably in the presence of stirring.

It may be advantageous to add seeds to the reaction mixture to reduce the time required to form nuclei and/or the total crystallization time. It may also be advantageous to use seeds to encourage the formation of crystalline IM-9 to the detriment of impurities. Said seeds comprise crystalline solids, in particular crystals of solid IM-9. The crystalline seeds are generally added in a proportion in the range 0.01% to 10% by weight of the oxide $XO_2$, preferably silica, used in the reaction mixture.

At the end of the reaction, the solid phase is filtered and washed; it is then ready for subsequent steps such as drying, dehydration and calcining and/or ion exchange.

If the reaction product contains alkali metal ions, these must be at least partially eliminated with a view to preparing the hydrogen form of the crystalline solid IM-9 in accordance with the invention, using at least one ion exchange with an acid, in particular a mineral acid such as hydrochloric acid and/or using an ammonium compound obtained by ion exchange with a solution of an ammonium salt such as ammonium chloride. Ion exchange can be carried out using a thick suspension, in one or more passes in the ion exchange solution. The crystalline solid is generally calcined prior to ion exchange to eliminate all absorbed organic substances so that ion exchange is facilitated. All of the operating conditions for eliminating the organic template and/or ion exchange are known to the skilled person.

In general, the cation(s) of the crystalline solid IM-9 can be replaced by any or all metal cations, in particular those from groups IA, IB, IIA, IIB, IIIA, IIIB (including the rare earths), and VIII (including the noble metals) of the periodic table, and by tin, lead or bismuth. Exchange is normally carried out with a solution containing a suitable cation salt, in a manner that is known to the skilled person.

The present invention concerns the use of the crystalline solid IM-9 of the invention as an adsorbant to control pollution or as a molecular sieve for separation. It is also advantageously used as a solid acid to catalyze the reactions, for example those occurring in the fields of refining and petrochemistry.

Thus, the present invention also concerns an adsorbant comprising the crystalline solid IM-9 of the invention. When used as an adsorbant, the crystalline solid IM-9 of the invention is generally dispersed in an inorganic matrix phase which contains channels and cavities which provide the fluid to be separated with access to the crystalline solid. Said matrices are preferably mineral oxides, for example silicas, aluminas, silica-aluminas or clays. The matrix generally represents between 2% and 25% by weight of the adsorbant formed.

The present invention also concerns a catalyst comprising the crystalline solid IM-9 of the invention. When it is used as a catalyst, the crystalline solid IM-9 of the invention can be associated with an inorganic matrix, which may be inert or catalytically active, and with a metallic phase. The inorganic matrix can be present simply as a binder to keep the small particles of crystalline solid IM-9 together in the different known forms of catalysts (extrudates, pellets, beads, powders), or can be added as a diluent to impose a degree of conversion on the process which otherwise would occur at too high a rate, leading to fouling of the catalyst as a result of the formation of large amounts of coke. Typical inorganic matrices are support materials for catalysts, such as the different forms of silica, alumina, silica-alumina, magnesia, zirconia, titanium oxide, boron oxide, aluminium phosphate, titanium phosphate, zirconium phosphate, clays such as kaolin, bentonite, montmorillonite, sepiolite, attapulgite, Fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of those compounds. The inorganic matrix can be a mixture of different compounds, in particular an inert phase and an active phase.

The crystalline solid IM-9 of the invention can also be associated with at least one other zeolite and can act as the principal active phase or the additive.

The metallic phase can be introduced integrally into the solid IM-9. It can also be introduced integrally with the inorganic matrix or onto the inorganic matrix-crystalline solid IM-9 ensemble by ion exchange or impregnation with cations or oxides selected from the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic table.

Catalytic compositions comprising the solid IM-9 of the invention are generally suitable for use in the principal processes, for transforming hydrocarbons and for organic compound synthesis reactions.

Catalytic compositions comprising the solid IM-9 of the invention advantageously find application in the following reactions: isomerisation, transalkylation and disproportionation, alkylation and dealkylation, hydration and dehydration, oligomerization and polymerization, cyclization, aromatization, cracking and hydrocracking, reforming, hydrogenation and dehydrogenation, oxidation, halogenation, amine synthesis, hydrodesulphurization and hydrodenitrogenation, catalytic elimination of oxides of nitrogen, said reactions involving feeds comprising saturated and unsaturated aliphatic hydrocarbons, aromatic hydrocarbons, oxygen-containing organic compounds and organic compounds containing nitrogen and/or sulphur, and organic compounds containing other functional groups.

The invention will be illustrated by the following examples.

EXAMPLE 1

Preparation of a Crystalline Solid IM-9 in Accordance with the Invention 15.41 g of an aqueous 20% solution of (6R,10S)-6,10-dimethyl-5-azoniaspiro-[4,5]decane hydroxide (ROH) and 1.75 g of amorphous germanium oxide (Aldrich) were poured into a polypropylene beaker. After dissolving the oxide with stirring, 3.47 g of tetraethoxysilane (Aldrich) was added. The ethanol and excess water were evaporated off at ambient temperature and with stirring until a mass of 17.33 g was reached. 0.83 g of 40% by weight hydrofluoric acid in water (Fluka) was added and it was stirred until a homogeneous paste was formed. The gel was then transferred into a Teflon liner then the liner was placed in a 20 millilitre autoclave.

The molar composition of the gel was 0.5 $SiO_2$: 0.5 $GeO_2$: 0.5 ROH: 0.5 HF: 20 $H_2O$.

The autoclave was heated in an oven for 4 days at 170° C. During synthesis, the autoclave was stirred constantly, the longitudinal axis of the autoclave rotating at a speed of about 15 rpm in a plane perpendicular to the axis of rotation. The pH of the synthesis was close to 8. After filtering, the product was washed with distilled water and dried at 70° C. The dry solid product was analyzed by powder X ray diffraction and identified as being constituted by the solid IM-9. The diffractogram recorded for the as synthesized sample is shown in FIG. 1. Chemical analysis of the product by X ray fluorescence was carried out and produced a $SiO_2/GeO_2$ ratio of 1.46.

EXAMPLE 2

Preparation of a Crystalline Solid IM-9 in Accordance with the Invention 15.41 g of an aqueous 20% solution of (6R,10S)-6,10-dimethyl-5-azoniaspiro-[4,5]decane hydroxide (ROH) and 1.75 g of amorphous germanium oxide (Aldrich) were poured into a polypropylene beaker. 0.0520 g of aluminium hydroxide (Aldrich) (64.5%–67% by weight of $Al_2O_3$) was added. After dissolving the oxides with stirring, 3.47 g of tetraethoxysilane (Aldrich) was added. The ethanol and excess water were evaporated off at ambient temperature and with stirring until a mass of 17.36 g was reached. 0.83 g of 40% by weight hydrofluoric acid in water (Fluka) was added and it was stirred until a homogeneous paste was formed. The gel was then transferred into a Teflon liner, then the liner was placed in a 20 milliliter autoclave.

The molar composition of the gel was as follows:

0.5 $SiO_2$: 0.5 $GeO_2$: 0.01 $Al_2O_3$: 0.5 ROH: 0.5 HF: 20 $H_2O$.

The autoclave was heated in an oven for 6 days at 170° C. During synthesis, the autoclave was stirred constantly, the longitudinal axis of the autoclave rotating at a speed of about 15 rpm in a plane perpendicular to the axis of rotation. The pH of the synthesis was close to 8. After filtering, the product was washed with distilled water and dried at 70° C. The dry solid product was analyzed by powder X ray diffraction and identified as being constituted by the solid IM-9. The diffractogram recorded for the as synthesized sample is shown in FIG. 1.

EXAMPLE 3

Preparation of a Catalyst Containing the Zeolitic Crystalline Solid IM-9

The zeolite used was the as synthesized zeolite from Example 2, with an overall (Si+Ge)/Al ratio of close to 90 and comprising the organic template (6R,10S)-6,10-dimethyl-5-azoniaspiro-[4,5]decane.

This zeolite first underwent calcining at 550° C. for 6 hours in a stream of air. The solid obtained was formed into extrudates by milling with boehmite (Pural SB3, Sasol), in a Z arm mill and extruding the paste obtained with a piston extruder. The extrudates were then dried at 120° C. for 12 h in air and calcined at 550° C. for 2 h in a stream of air in a muffle furnace. Platinum was deposited on the alumina of this support by anion exchange with hexachloroplatinic acid in the presence of a competing agent (hydrochloric acid). The exchanged support was then dried at 120° C. for 12 h in air and calcined for 1 h at 550° C. in a stream of dry air.

The prepared catalyst was composed of 50% of the zeolitic solid IM-9 with a (Si+Ge)/Al ratio of 90, 49.8% of alumina and 0.14% of platinum.

EXAMPLE 4

Preparation of an Adsorbant Containing the Zeolitic Crystalline Solid IM-9

The zeolite used was the as synthesized zeolite from Example 1 (purely silicic), comprising the organic template (6R,10S)-6,10-dimethyl-5-azoniaspiro-[4,5]decane.

This zeolite first underwent calcining at 550° C. for 6 hours in a stream of air. The solid obtained was then formed into extrndates by milling with boehmite (Pural SB3, Sasol), in a Z arm mill and extruding the paste obtained with a piston extruder. The extrudates were then dried at 120° C. for 12 h in air and calcined at 550° C. for 2 h in a stream of air in a muffle furnace.

The prepared adsorbant was composed of 80% of purely silicic zeolitic solid IM-9 and 20% of alumina.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure of all applications, patents and publications, cited herein and of corresponding France application No. 0300431, filed Jan. 16, 2003, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A zeolitic crystalline solid IM-9 with an X ray diffraction diagram including at least the peaks listed in the table below:

| $d_{hkl}$ (Å) | $I/I_0$ | 2theta (degrees) |
|---|---|---|
| 13.74 | mw | 6.425 |
| 12.74 | VS | 6.933 |
| 11.42 | vw | 7.735 |
| 9.36 | w | 9.442 |
| 8.30 | m | 10.653 |
| 6.94 | vw | 12.745 |
| 6.23 | vw | 14.204 |
| 6.06 | vw | 10.605 |
| 5.79 | vw | 15.291 |
| 5.47 | vw | 16.192 |
| 5.11 | vw | 17.337 |
| 4.76 | mw | 18.627 |
| 4.56 | vw | 19.452 |
| 4.52 | vw | 19.625 |
| 4.32 | vw | 20.541 |
| 4.25 | w | 20.887 |
| 4.17 | vw | 21.291 |
| 4.06 | w | 21.876 |
| 3.97 | mw | 22.377 |
| 3.79 | w | 23.449 |
| 3.65 | w | 24.365 |
| 3.57 | w | 24.917 |
| 3.44 | w | 25.874 |
| 3.39 | vw | 26.262 |
| 3.30 | vw | 26.995 |
| 3.19 | vw | 27.946 |
| 3.12 | w | 28.589 |
| 3.07 | vw | 29.067 |
| 2.98 | vw | 29.956 |
| 2.91 | vw | 30.698 |
| 2.84 | vw | 31.473 |
| 2.76 | vw | 32.413 |
| 2.55 | vw | 35.160 |
| 2.49 | vw | 36.040 |
| 2.44 | vw | 36.798 |
| 2.40 | vw | 37.441 |
| 2.38 | vw | 37.763 |
| 2.35 | vw | 28.266 |
| 2.13 | vw | 42.404 | in which VS=very strong; S=strong; m=medium; mw=medium weak; w=weak; vw=medium weak, and having a chemical composition, expressed as the anhydrous base in terms of the moles of oxides, defined by the following general formula: $XO_2$: $mYO_2$: $pZ_2O_3$: $qR_{2/n}O$: $sF$ (I), in which R represents one or more cation(s) with valency n, X represents one or more tetravalent element(s) other than germanium, Y represents germanium, Z represents at least one trivalent element and F is fluorine, m, p, q, s respectively representing the number of moles of $YO_2$, $Z_2O_3$, $R_{2/n}O$ and F and m is in the range 0.1 to 0.9, p is in the range 0 to 0.5, q and s are in the range 0.01 to 0.7, the ratio $\{(1+m)/p\}$ being 5 or more.

2. A crystalline solid IM-9 according to claim 1, in which X is silicon.

3. A crystalline solid IM-9 according to claim 1, in which Z is aluminium.

4. A process for preparing a crystalline solid IM-9 in accordance with claim 1, in which an aqueous mixture comprising at least one source of at least one oxide $XO_2$, optionally at least one source of an oxide $YO_2$, optionally at least one source of at least one oxide $Z_2O_3$, optionally at least one source of an oxide $M_{2/w}O$ and at least one organic nitrogen-containing cation R or at least one precursor of an organic nitrogen-containing cation or at least one decomposition product of an nitrogen-containing organic cation, then carrying out a hydrothermal treatment on said mixture until said crystalline solid IM-9 is formed.

5. A process for preparing a zeolitic crystalline solid IM-9 according to claim 4, in which the molar composition of the reaction mixture is such that:

| | |
|---|---|
| $(XO_2 + YO_2)/Z_2O_3$ | at least 5; |
| $M_{2/w}O/(XO_2 + YO_2)$ | 0 to 3; |
| $H_2O/(XO_2 + YO_2)$ | 1 to 50; |
| $R/(XO_2 + YO_2)$ | 0.1 to 3; |
| $F/(XO_2 + YO_2)$ | 0.1 to 3; |
| $YO_2/XO_2$ | 0 to 1; |
| $L_aS/XO_2$ | 0 to 0.5 |

6. A process for preparing a zeolitic crystalline solid IM-9 according to claim 4, in which R is a salt of (6R,10S)-6,10-dimethyl-5-azoniaspiro-[4,5]decane.

7. A process according to claim 4, comprising adding seeds to the reaction mixture.

8. In a process comprising separating molecules with a molecular sieve, the improvement wherein the molecular sieve comprises a crystalline solid according to claim 1.

9. In a process comprising catalytically transforming hydrocarbons, the improvement wherein the catalyst comprises a crystalline solid according to claim 1.

10. A crystalline solid IM-9 according to claim 2, in which Z is aluminium.

11. A crystalline solid IM-9 according to claim 1 having an X-ray diffraction diagram according to FIG. 1.

* * * * *